US009833302B2

(12) United States Patent
Tomc et al.

(10) Patent No.: US 9,833,302 B2
(45) Date of Patent: Dec. 5, 2017

(54) VAGINAL VAULT SUSPENSION SYSTEM AND METHOD

(71) Applicants: John Tomc, LaSalle (CA); Bradley Jasey, Windsor (CA)

(72) Inventors: John Tomc, LaSalle (CA); Bradley Jasey, Windsor (CA)

( * ) Notice: Subject to any disclaimer, the term of this patent is extended or adjusted under 35 U.S.C. 154(b) by 104 days.

(21) Appl. No.: 14/387,523

(22) PCT Filed: Mar. 28, 2013

(86) PCT No.: PCT/IB2013/001260
§ 371 (c)(1),
(2) Date: Sep. 23, 2014

(87) PCT Pub. No.: WO2013/144729
PCT Pub. Date: Oct. 3, 2013

(65) Prior Publication Data
US 2015/0094525 A1 Apr. 2, 2015

Related U.S. Application Data

(60) Provisional application No. 61/616,614, filed on Mar. 28, 2012.

(51) Int. Cl.
*A61F 2/04* (2013.01)
*A61F 2/00* (2006.01)
(Continued)

(52) U.S. Cl.
CPC ........ *A61F 2/0063* (2013.01); *A61B 17/0401* (2013.01); *A61B 17/06109* (2013.01);
(Continued)

(58) Field of Classification Search
CPC .... A61F 2/0031; A61F 2/0036; A61F 2/0045; A61F 2/0063; A61F 2002/0072; A61B 2017/00805
See application file for complete search history.

(56) References Cited

U.S. PATENT DOCUMENTS

| 2003/0065402 A1* | 4/2003 | Anderson | A61F 2/0045 623/23.66 |
| 2009/0221868 A1* | 9/2009 | Evans | A61F 2/0045 600/37 |

(Continued)

FOREIGN PATENT DOCUMENTS

| WO | 2009017680 A2 | 2/2009 |
| WO | 2010028242 A1 | 3/2010 |

(Continued)

OTHER PUBLICATIONS

International Search Report and Written Opinion for PCT Application No. PCT/IB2013/001260, dated Nov. 6, 013, 10 pages.

*Primary Examiner* — Charles A Marmor, II
*Assistant Examiner* — Thaddeus Cox
(74) *Attorney, Agent, or Firm* — Brake Hughes Bellermann LLP

(57) ABSTRACT

Repair implant systems for treating pelvic prolapse including vaginal vault suspension devices and methods are provided. Embodiments of the system can include one or more eyelet and/or locking eyelet devices and one or more spanning members, e.g., suture members, attached thereto. Ends of the suture members are attached to the vaginal vault. An extension member can be provided with a corresponding anchor, with the extension member adjustably engaged with an eyelet to provide the desired vault suspension.

10 Claims, 4 Drawing Sheets

(51) Int. Cl.
*A61B 17/06* (2006.01)
*A61B 17/34* (2006.01)
A61B 17/00 (2006.01)
A61B 17/04 (2006.01)

(52) U.S. Cl.
CPC .... *A61B 17/06166* (2013.01); *A61B 17/3468* (2013.01); *A61B 2017/00805* (2013.01); *A61B 2017/0412* (2013.01); *A61B 2017/0414* (2013.01); *A61B 2017/0427* (2013.01); *A61B 2017/0456* (2013.01); *A61B 2017/0464* (2013.01); *A61B 2017/06176* (2013.01); *A61F 2002/0072* (2013.01); *A61F 2220/0016* (2013.01)

(56) References Cited

U.S. PATENT DOCUMENTS

| | | | | |
|---|---|---|---|---|
| 2010/0261955 | A1* | 10/2010 | O'Hern | A61B 17/0401 600/37 |
| 2011/0124954 | A1* | 5/2011 | Ogdahl | A61F 2/0045 600/30 |
| 2011/0152896 | A1* | 6/2011 | Purvis, Jr. | A61F 2/0063 606/151 |

FOREIGN PATENT DOCUMENTS

| | | | |
|---|---|---|---|
| WO | 2011063412 | A2 | 5/2011 |
| WO | 2013144729 | A2 | 10/2013 |

* cited by examiner

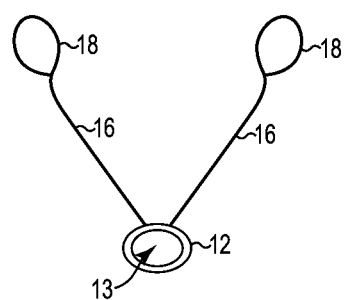
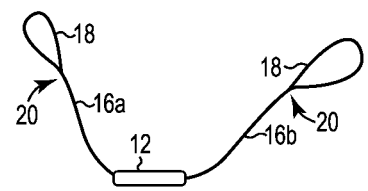
Fig. 1  Fig. 2
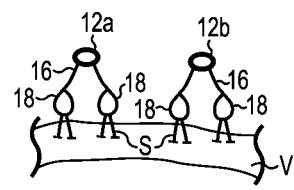
Fig. 3

VAGINAL VAULT SUSPENSION SYSTEM AND METHOD

PRIORITY

This application claims priority to and the benefit of U.S. Provisional Patent Application No. 61/616,614, filed Mar. 28, 2012, which is incorporated fully herein by reference in its entirety.

FIELD OF THE INVENTION

The present invention relates generally to surgical methods and apparatus and, more specifically, to implant systems and methods for treating pelvic conditions, such as vaginal prolapse conditions.

BACKGROUND OF THE INVENTION

Pelvic health for men and women is a medical area of increasing importance, at least in part due to an aging population. Examples of common pelvic ailments include incontinence (e.g., fecal and urinary), pelvic tissue prolapse (e.g., female vaginal prolapse), and conditions of the pelvic floor via a transperitoneal procedure.

Pelvic prolapse, including vaginal prolapse, can be caused by the weakening or breakdown of various parts of the pelvic support system, such as the pelvic floor or tissue surrounding the vagina. Due to the lack of support, structures such as the uterus, rectum, bladder, urethra, small intestine, or vagina, may begin to fall out of their normal positions. Prolapse may cause pelvic discomfort and may affect bodily functions such as urination and defecation. Pelvic prolapse conditions can be treated by various surgical and nonsurgical methods. Non-surgical treatments for vaginal prolapse include pelvic muscle exercises, estrogen supplementation, and vaginal pessaries. The Perigee® system, developed by American Medical Systems located in Minnetonka, Minn., is a surgical technique for the repair of anterior vaginal prolapse. Additionally, the Apogee® system, developed by American Medical Systems located in Minnetonka, Minn., is a surgical technique for the repair of vaginal vault prolapse and posterior prolapse.

Urinary incontinence can further be classified as including different types, such as stress urinary incontinence (SUI), urge urinary incontinence, mixed urinary incontinence, among others. Other pelvic floor disorders include cystocele, rectocele, enterocele, and prolapse such as anal, uterine and vaginal vault prolapse. A cystocele is a hernia of the bladder, usually into the vagina and introitus. Posterior prolapse, or rectocele, can occur when the fascia that separates the rectum and the vagina weakens or tears, thereby causing a bulge of the vaginal wall. Pelvic disorders such as these can result from weakness or damage to normal pelvic support systems.

Urinary incontinence can be characterized by the loss or diminution in the ability to maintain the urethral sphincter closed as the bladder fills with urine. Male or female stress urinary incontinence (SUI) generally occurs when the patient is physically stressed.

Urinary incontinence can be characterized by the loss or diminution in the ability to maintain the urethral sphincter closed as the bladder fills with urine. Male or female stress urinary incontinence (SUI) occurs when the patient is physically stressed.

A variety of treatment options are currently available to treat incontinence. Some of these treatment options include external devices, behavioral therapy (such as biofeedback, electrical stimulation, or Kegal exercises), injectable materials, prosthetic devices and/or surgery. Depending on age, medical condition, and personal preference, surgical procedures can be used to completely restore continence. Types of procedure found to be an especially successful treatment option for SUI in both men and women can include sling or implant procedures. There are a variety of different sling procedures. Slings used for pubovaginal procedures differ in the type of material and anchoring methods.

One such implant procedure is the Elevate® anterior or posterior implant systems sold by American Medical Systems, Inc. of Minnetonka, Minn. The Elevate® posterior implant system utilizes self-fixating tips that allow for mesh placement in the sacrospinous ligament through a single vaginal incision to treat apical and/or posterior vaginal prolapse.

There is a desire to provide a vaginal vault suspension system for repairing prolapse in patients.

SUMMARY OF THE INVENTION

The present invention provides repair systems and procedures for treating pelvic prolapse by providing vaginal vault suspension devices and methods. Embodiments of the system can include one or more eyelet and/or locking eyelet devices and one or more spanning members, e.g., suture members, attached thereto. Ends of the suture members are attached to the vaginal vault. An extension member can be provided with a corresponding anchor, with the extension member adjustably engaged with an eyelet to provide the desired vault suspension. The extension member can further include a mesh portion and a non-mesh portion. The anchor is generally adapted for fixation or engagement with tissue a distance away from the vaginal vault, e.g., the sacrospinous ligament.

The mesh portion of the extension member can be passed through the eyelets. For those embodiments where the eyelet is a locking eyelet with extending teeth or members, this sliding can create the frictional engagement required to adjust the length of the extension member relative to the eyelet, and thus the tensioning adjustment and vault suspension of the system. For those embodiments where a separate locking eyelet is employed, that eyelet can be slid onto and along the non-mesh portion (e.g., polymer rod or stem), and eventually onto the mesh portion using a tool. As the eyelet is slid into engagement with the mesh portion of the respective extension, the teeth of the eyelet can be configured to frictionally engage the mesh filaments such that a one-way locking adjustment is facilitated. These one-way eyelets generally move easily up and along the extension portion in a first direction toward the anchor, and are generally inhibited from moving in a direction opposite that first direction when placed on the mesh portion. Pushing or sliding the eyelet further along the mesh portion generally shortens the length between the eyelet and the anchor, thus tensioning or shortening the implant.

Other embodiments of the implant system can obviate the need for eyelets by including one or more anchors having two or more spanning members (e.g., suture members) extending therefrom. Each of the spanning members can include ends adapted for fixation or attachment to tissue (e.g., the vault) via suturing or like means. Again, the tissue site for the anchors can be the sacrospinous ligament SSL, or like target sites a distance away from the vaginal vault or vaginal wall. A free needle can be included to push the spanning suture members through the vault tissue for attachment, e.g., tying off or securing the sutures to the vault. As a result, a spanning suspension system is provided between the engaged anchors and the engaged end portions of the spanning sutures to provide improved vaginal vault suspension to treat the corresponding prolapse condition.

BRIEF DESCRIPTION OF THE DRAWINGS

FIG. 1 is a top view of an eyelet implant portion and spanning members extending therefrom, in accordance with embodiments of the present invention.

FIG. 2 is a side view of an eyelet implant portion and spanning members extending therefrom, in accordance with embodiments of the present invention.

FIG. 3 is a schematic view of two eyelet implant portions and spanning members extending therefrom and attached to the vaginal vault, in accordance with embodiments of the present invention.

DETAILED DESCRIPTION OF PREFERRED EMBODIMENTS

Figure 4:
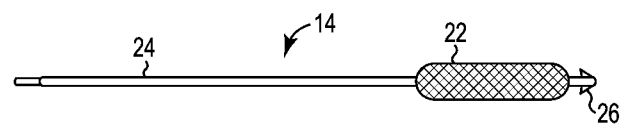
FIG. 4 is a view of an extension arm or portion of an implant, in accordance with embodiments of the present invention.
Figure 5:
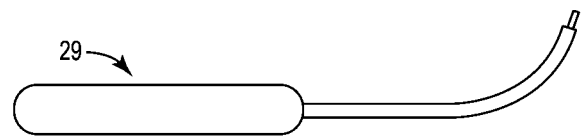
FIG. 5 is a view of a needle delivery tool, in accordance with embodiments of the present invention.
Figure 6:
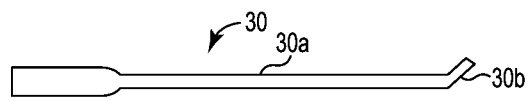
FIG. 6 is a view of a grommet or locking eyelet tool, in accordance with embodiments of the present invention.

Referring generally to FIGS. 1-11, prolapse implant and repair systems 10 and methods are shown. Various embodiments of the system 10, as shown in FIGS. 1-8, are adjustable and can include an eyelet 12, one or more extension or arm members or portions 14 and one or more spanning members 16. The spanning members 16 can be one or more suture members. The suture members 16 can be constructed of a polymer material, such as prolene, polypropylene or like materials. The eyelets 12 can be constructed of polypropylene or like materials. The components of the system can be introduced and deployed transvaginally. Moreover, the approach can be made from either the anterior or posterior compartment.

The various implants or systems, anchors, mesh, tools, devices, features and methods disclosed in U.S. Patent Application Publication Nos. 2013/0035543, 2010/0274074 and 2010/0261955, and PCT Patent Application Publication No. WO 2009/017680 can be used or employed, in whole or in part, with embodiments of the present invention. Accordingly, the above-identified publications are fully incorporated herein by reference in their entirety.

The eyelet 12 can be constructed of a polymer material, and can be connected to or otherwise provided with one or more of the spanning members 16 (e.g., sutures) extending therefrom, as depicted in FIGS. 1-2. As shown in FIG. 3, the system 10 can include a first eyelet 12a and a second eyelet 12b, both adapted for positioning and adjustable fixation as described herein.

Figure 7:
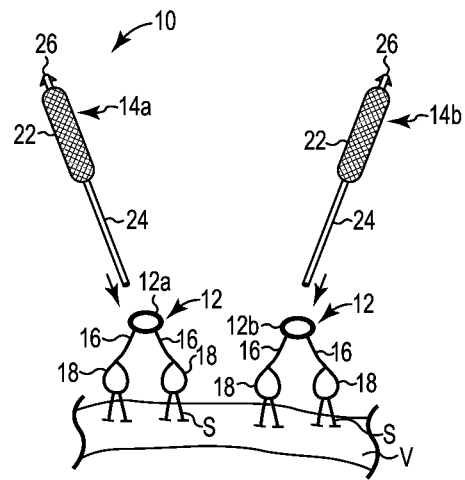
FIGS. 7-8 are schematic views of eyelets, spanning members, and extension arm portions of an implant system being positioned, engaged and adjusted, in accordance with embodiments of the present invention.
Figure 8:
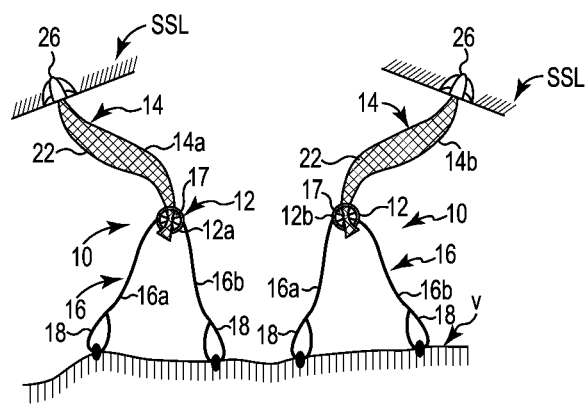

Referring generally to FIGS. 7-8, in various embodiments a first spanning member 16a can extend from a side or other portion of the eyelet 12, with a second spanning member 16b extending from another side or portion of the eyelet 12. The spanning members 16a, 16b can be tied, adhered, looped around, or otherwise attached to the eyelet 12. One or both of the spanning members 16a, 16b can include a suture loop 18 or a like feature at a member end 20 distal the eyelet 12. The suture loops 18 are generally adapted for fixation to tissue, such as the vaginal vault V, vaginal wall, or the like. The suture loops 18 can be directly fixated to the tissue, or attached via separate sutures S, or like devices or techniques.

In certain embodiments the eyelets 12 are circular, oval, or elongate, and include an aperture 13. The aperture 13 may be generally smooth and free of tines, teeth or other such features. In other embodiments, the aperture 13 of the eyelets 12 can include a plurality of inward extending and/or angled members, flaps or teeth adapted to engage with the one or more extension portions 14 (e.g., mesh portion). In general, this allows for "one-way" adjustment, such as shortening of a length of the extension portion 14 relative to the respective eyelet 12. These adjusting engagements can allow for adjustment of a length of the implant portion in one direction and not in an opposite direction. For example, a segment of the extension portion 14 can frictionally engage with teeth of the eyelet 12 to inhibit movement of the extension portion 14, thereby allowing movement of the extension portion 14 through the aperture 13 in one direction while inhibiting movement of the extension portion 14 through the aperture 13 in a reverse or opposing direction.

For those embodiments where the eyelets 12 are not locking eyelets, separate locking eyelets 17 can be introduced over and along the extension portions 14 to adjust and secure the eyelets 12 with the respective extension portions 14—e.g., in a one-way engagement manner. Other embodiments can allow for two-way adjustment.

FIG. 4 shows an extension portion 14 adapted for use with embodiments of the present invention. With such embodiments, the extension portion can include a mesh portion 22 and non-mesh portion 24. A tissue fastener or anchor 26 can be attached to other otherwise provided to a distal end of the mesh portion 22, and can affix to or engage with tissue a distance away from the vaginal vault, e.g., the sacrospinous ligament SSL. The anchors 26 can include one or more tines to facilitate tissue fixation. The non-mesh portion 24 can be a polymeric (e.g., polypropylene) stem or rod 24 attached to or otherwise provided with (e.g., integral to) a proximal end of the mesh portion 22. The rod 24 can be formed by any method and may be integrally attached to the mesh portion 22, or attached by any technique. As an example, the rod 24 may be prepared by starting with a length of mesh material that is integral to the mesh portion 22. The length of mesh can be heat treated at a desired melting temperature (according to the type of polymer of the mesh) to melt the mesh into a polymeric rod having stiff yet flexible mechanical properties. In other embodiments, the entire length of the extension portion 14 can be constructed of a mesh material.

Again referring to FIGS. 7-8, certain embodiments of the system 10 can include a first extension portion 14a and a second extension portion 14b. The first extension portion 14a can be adapted to slide through and selectively engage with the first eyelet portion 12a, and the second extension portion 14b can be adapted to slide through and selectively engage with the second eyelet portion 12b (e.g., with a locking eyelet 12 or a separately attached/slid locking eyelet).

For those embodiments where a separate grommet or locking eyelet 17 (e.g., FIG. 8) is being employed to adjustably attach an extension portion 14 to an eyelet 12, a grommet delivery tool 30 (FIG. 6) can be used. The tool 30 can be included in a kit with the extension portions 14, eyelet assemblies (e.g., eyelets with attached sutures and loops), and other tools or components for the implant system 10. The separate locking eyelet 17 can be slid onto the rod or non-mesh portion 24 of the extension 14 using a tool, device, or via manual manipulation, after the portion 24 has been slid or otherwise positioned through the respective eyelet 12. A single separate locking eyelet 17, or multiple locking eyelets, can be transferred onto the portion 24. This process can be done bilaterally, e.g., with both eyelets 12a, 12b and corresponding extension portions 14a, 14b.

The tool 30 can include an elongate shaft 30a and a distal end 30b. A slot or similar feature at the distal end 30b can engage the separate eyelet 17 for sliding past the portion 24 to adjust and secure the extension 14. Portions of the tools, e.g., distal end 30b, can be curved, straight, angled, etc.

The anchors 26 of each of the extension portions 14 (e.g., 14a, 14b) are engageable with tissue a distance from the vault V, such as the sacrospinous ligament SSL, the obturator foramen, or like target sites. A needle delivery tool, such as tool 29 (FIG. 5), can be used to deploy and engage the anchors 26 with the target tissue. Further, a sleeve or sheath can be included to slide over or shroud a length of the needle portion of the tool 29 to facilitate navigation through tissue paths during deployment. The loops 18 or member ends 20 of the sutures 16a, 16b extending from each of the respective eyelets 12 can be attached to the vault V via suturing or like means, before or after the anchors 26 are fixated with tissue.

Further, the portion 24 of the extensions 14 can be passed through the eyelets 12. For those embodiments where the eyelet 12 is a locking eyelet with extending teeth or members, this sliding can create the frictional engagement required to adjust the length of the extension member relative to the eyelet, and thus the tensioning adjustment of the system. For those embodiments where a separate locking eyelet 17 is employed, the eyelet 17 can be slid onto and along the portion 24, and eventually onto the mesh portion 22, using the tool 30. As the eyelet 17 is slid into engagement with the mesh portion 22 of the respective extension 14, the teeth of the eyelet 17 are configured to frictionally engage the mesh filaments such that a one-way locking adjustment is facilitated. These one-way eyelets 17 generally move easily up and along the extension portion 14 in a first direction toward the anchor 26, and are generally inhibited from moving in a direction opposite that first direction when engaged with the mesh portion 22. Once placed onto the extension portion 14, the locking eyelet or grommet 17 can slide to engage and fix a length of the extension portion 14 in place relative to the eyelet 12. As such, pushing or sliding the eyelet 17 further along the mesh portion 22 generally shortens the length between the eyelet 12 and the anchor 26, thus tensioning or shortening the implant 10. Upon achieving the desired tension or adjustment, the rod portions 24 and/or portions of the mesh 22 extending out past the eyelet 12 can be cut off or trimmed.

Figures 9, 10:
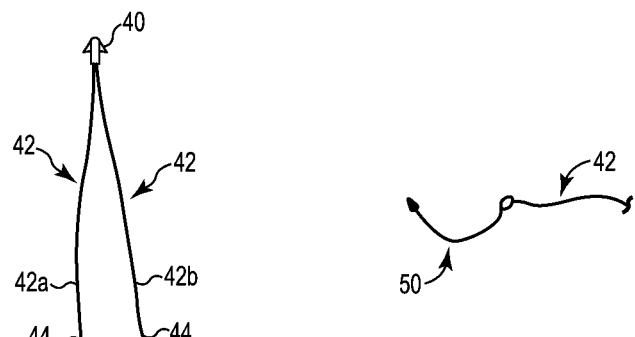
FIG. 9 is a view of an anchor and spanning members of an implant system, in accordance with embodiments of the present invention.
FIG. 10 is a view of a free needle and attached spanning member, in accordance with embodiments of the present invention.
Figure 11:
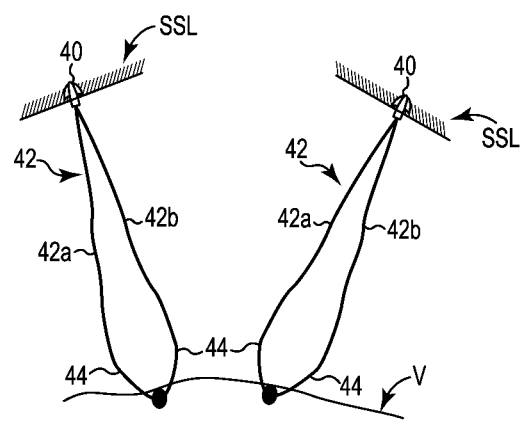
FIG. 11 is a schematic view of anchors and spanning members of an implant system being positioned and engaged, in accordance with embodiments of the present invention.

Other embodiments of the implant system can obviate the need for eyelets by including one or more anchors 40 having two or more spanning members 42 extending therefrom, as shown in FIGS. 9-11. Again, the members 42 can be suture members, e.g., prolene or like polymers. Each of the members, e.g., 42a, 42b, can include end portions 44. The end portions 44 can be free ends, or can include loops or like features adapted to facilitate fixation or attachment to tissue via suturing or like means.

The anchors 40 can be delivered using a tool, such as tool 29, to the target site and pushed into engagement with the tissue. The target site can be the sacrospinous ligament SSL, the obturator foramen, or like target sites a distance away from the vaginal vault or vaginal wall. The end portions 44 extending from each anchor 40 can then be attached to the vaginal vault or like tissue using suturing or similar techniques or devices. With various embodiments, a free needle 50 is included with the system 10. The free needle 50 is a small needle attached to or otherwise provided with one or more of the end portions 44 such that the end portions 44 can be pushed through, threaded, or otherwise engaged with the vault tissue V, and tied off to secure the end portions 44 with the vault tissue. As a result, a spanning suspension system is provided between the engaged anchors 40 and the engaged end portions 44 to promote vaginal vault suspension to treat the corresponding prolapse condition. The tensioning or length of the suspension can be shortened by providing shorter lengths of sutures 42 between the anchors 40 and the engaged vault tissue, or by tensioning or shortening the suture length before tying off the end portions 44 of the sutures 42 to the vault V.

All patents, patent applications, and publications cited herein are hereby incorporated by reference in their entirety as if individually incorporated, and include those references incorporated within the identified patents, patent applications and publications.

Obviously, numerous modifications and variations of the present invention are possible in light of the teachings herein. It is therefore to be understood that within the scope of the appended claims, the invention may be practiced other than as specifically described herein.

The invention claimed is:

1. A prolapse repair system, comprising:
an eyelet portion;
a first suture having a first end portion and a second end portion, the first end portion coupled directly to the eyelet at a first location on the eyelet, the second end portion including a first suture loop configured to be coupled to vaginal vault tissue;
a second suture having a first end portion and a second end portion, the first end portion of the second suture coupled directly to the eyelet at a second location on the eyelet, the second end portion of the second suture including a second suture loop configured to be coupled to the vaginal vault tissue; and
an extension arm having at least a mesh portion and a tissue anchor, the extension arm adjustably engageable with the eyelet portion, and the tissue anchor engageable with tissue a distance away from the vaginal vault tissue.

2. The system of claim 1, wherein the eyelet portion is a locking eyelet having a plurality of inward radiating teeth.

3. The system of claim 1, further including a locking eyelet adjustably engageable with the extension arm.

4. The system of claim 1, further comprising one or more vault sutures coupled to the first suture loop, and one or more vault sutures coupled to the second suture loop.

5. The system of claim 1, wherein the first suture includes a prolene material.

6. The system of claim 1, wherein the extension arm further includes a polymer rod portion extending from the mesh portion and slidable within the eyelet portion.

7. The system of claim 1, wherein the eyelet includes a polymer material.

8. The system of claim 1, further including an introducer needle to engage the tissue anchor with the tissue a distance away from the vaginal vault tissue.

9. The system of claim 1, further including a locking eyelet and a locking eyelet tool, the locking eyelet adjustably engageable with the extension arm via the locking eyelet tool.

10. The system of claim 1, further including:
- a second eyelet portion defining an aperture and a plurality of inward extending members;
- a third suture having a first end portion and a second end portion, the first end portion of the third suture directly coupled to the second eyelet portion, the second end portion of the third suture having a third suture loop configured to be coupled to the vaginal vault tissue;
- a fourth suture having a first end portion and a second end portion, the first end portion of the fourth suture directly coupled to the second eyelet portion, the second end portion of the fourth suture having a fourth suture loop configured to be coupled to the vaginal vault tissue; and
- a second extension arm having at least a mesh portion and a tissue anchor, the mesh portion of the second extension arm adjustably engageable with the second eyelet portion, and the tissue anchor of the second extension arm engageable with tissue a distance away from the vaginal vault tissue.

* * * * *